United States Patent [19]

Sielaff et al.

[11] Patent Number: 4,713,923
[45] Date of Patent: Dec. 22, 1987

[54] METHOD AND MEANS FOR BUILDING A PITCHED ROOF BUILDING USING ONLY SQUARE-END FRAMING MEMBERS

[75] Inventors: Ulrich Sielaff; David O. Hamel, both of Madison, Wis.

[73] Assignee: United Steel Products Company, Montgomery, Minn.

[21] Appl. No.: 733,085

[22] Filed: May 13, 1985

[51] Int. Cl.⁴ .................. E04B 1/48; E04B 7/06
[52] U.S. Cl. .......................... 52/713; 52/92; 52/665; 52/702; 403/190
[58] Field of Search .......... 52/90, 92, 702, 712, 52/713, 715, 698, 639–643, 655, 648, 665; 403/169, 170, 190, 205, 403

[56] References Cited

U.S. PATENT DOCUMENTS

| | | | |
|---|---|---|---|
| 583,247 | 5/1897 | Burnham | 52/92 |
| 813,253 | 2/1909 | Sullivan | 52/715 X |
| 2,500,636 | 3/1950 | Isakson | 52/702 X |
| 3,256,030 | 6/1966 | Banse | 52/712 |
| 3,423,898 | 1/1969 | Tracy et al. | 52/702 X |
| 4,335,555 | 6/1982 | Southerland et al. | 52/713 X |
| 4,410,294 | 10/1983 | Gilb et al. | 52/90 X |

FOREIGN PATENT DOCUMENTS

| | | | |
|---|---|---|---|
| 2411956 | 8/1975 | Fed. Rep. of Germany | 52/90 |
| 742617 | 12/1955 | United Kingdom | 403/176 |

OTHER PUBLICATIONS

Harlen Metal Products, Inc., Structural Timber Connectors brochure, ©1977.

Primary Examiner—William F. Pate, III
Assistant Examiner—Richard E. Chilcot, Jr.
Attorney, Agent, or Firm—Dorsey & Whitney

[57] ABSTRACT

A construction method is disclosed which utilizes entirely squared-end framing members to build a pitched roof building.

14 Claims, 12 Drawing Figures

METHOD AND MEANS FOR BUILDING A PITCHED ROOF BUILDING USING ONLY SQUARE-END FRAMING MEMBERS

BACKGROUND OF THE INVENTION

Pitched roof buildings are used throughout the world for the advantages they offer of preventing accumulation of water on the roof and of protecting sidewalls from water coursing down them when eaves are provided. By efficiently shedding moisture, such buildings are protected from leakage and from bacterial deterioration which accompanies a moist condition. Rafters used to construct a pitched roof conventionally require angle cutting and notching, a procedure which requires a level of skill beyond the ability of many people and which in consequence deters many people from undertaking to build even simple pitched roof structures.

SUMMARY OF THE DISCLOSURE

Building hardware of selective configuration for joining square-end framing members is provided to enable pitched roof buildings to be constructed without need for either angle cutting or notching roof rafters for properly joining the rafters to the ridge piece or to the walls of the building. Other hardware is provided which eliminates the need for toe-nailing framing members, a technique which like miter cutting of rafters, exceeds the skill of many persons to peroform. Utilization of the hardware and the method disclosed herein enables a novice in the art of carpentry to frame and erect without assistance a pitched roof structure which is true to plumb and square and with a roof pitch of any desired degree entirely without miter cutting or notching rafters or other framing members and to fasten the members together without toe-nailing.

DESCRIPTION OF THE INVENTION

Figure 1:
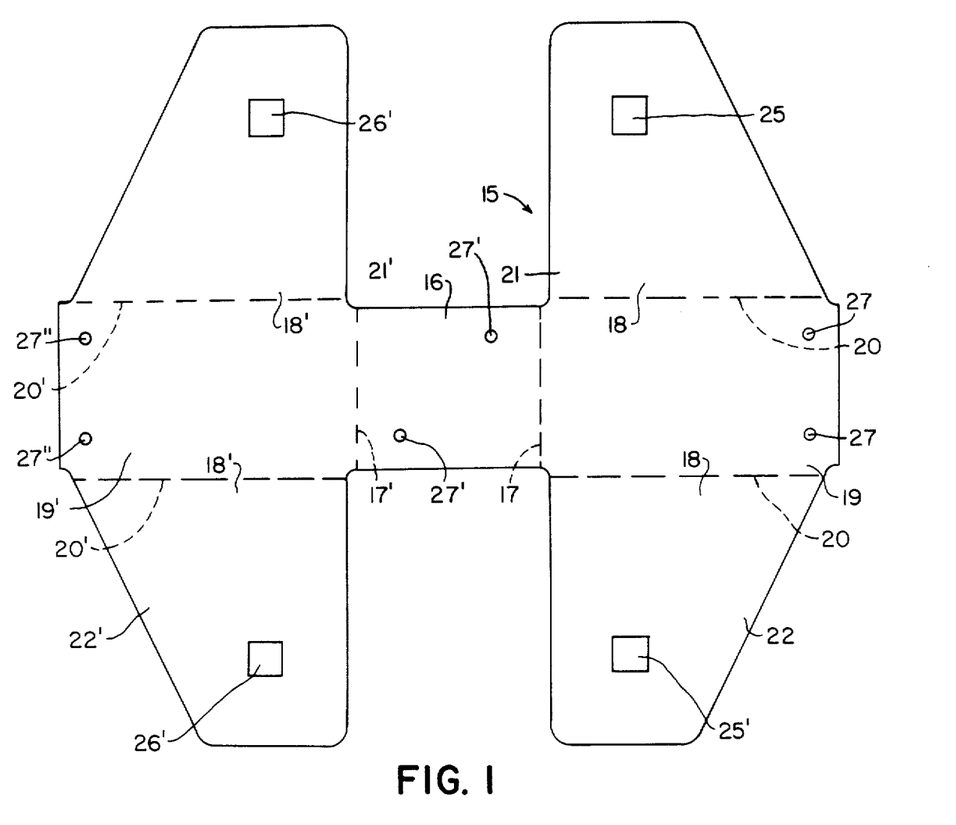
FIG. 1 is a plan view of a roof rafter ridge connector blank of this invention.
Figure 2:
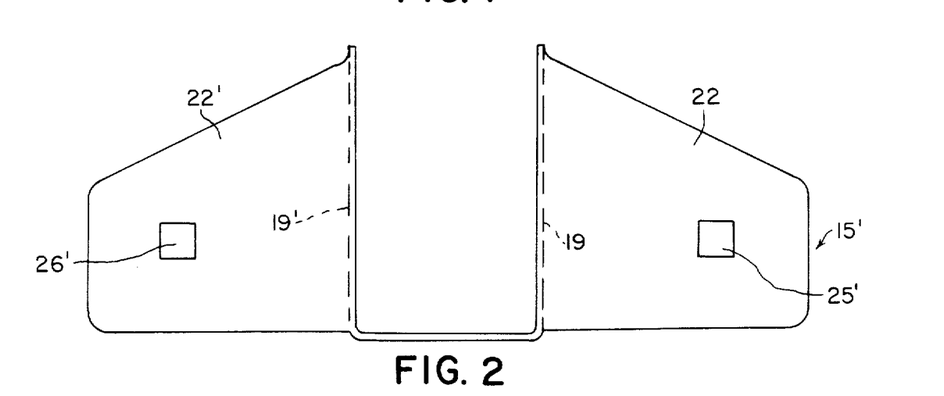
FIG. 2 is a side elevation of the connector of FIG. 1 formed into finished shape.
Figure 3:
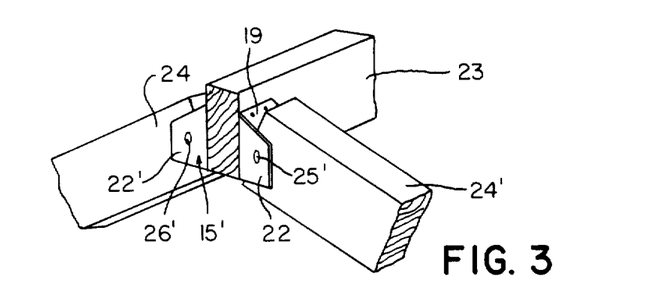
FIG. 3 is a perspective view of the connector of FIG. 1 applied to framing members.

Referring to FIGS. 1, 2 and 3, roof ridge to rafter connector blank 15 is shown configured symmetrically in FIG. 1 stamped from metal sheet or plate such as galvanized steel although any other operable material may be used. The connector blank 15 includes a rectilinear central planar portion 16 defined laterally in the view shown by dashed lines 17, 17' to indicate boundaries or portion 16, but which do not appear on an actual embodiment. The connector blank 15 also includes terminal portions 18, 18', each having a back portion 19, 19' for forming a channel, defined respectively by dashed lines 17, 20 and 17', 20' as shown in FIG. 1. Each of the channels has a pair of planar side portions 21, 22 and 21', 22', respectively, which can be bent perpendicularly to back portions 19, 19' to form planar facing channel side members shown in FIGS. 2 and 3 illustrations of connector 15'. In FIGS. 2 and 3, the connector 15 is shown with back portions 19, 19' further bent along lines 17, 17' to be in substantially parallel relationship with respect to one another and in substantially perpendicular disposition to central portion 16 thereby to cause said side portion pairs 21, 22 and 21', 22', and central portion 16 to be disposed in mutually perpendicular orientation. As illustrated in FIG. 3, roof ridge member 23 is operably carried in the pocket formed by the separation between back portions 19, 19' and central portion 16 of connector 15'. The topmost end portions of rafters 24, 24' are fixed in position between side portions 21, 22 and 21', 22' by means of carriage bolts or other fastener engaged through holes 25, 25' and 26, 26'. Nailing holes 27, 27', 27" are shown for enabling connector 15' to be secured to roof ridge member 23, however, any other pattern of holes can be provided as desired.

Figure 4:
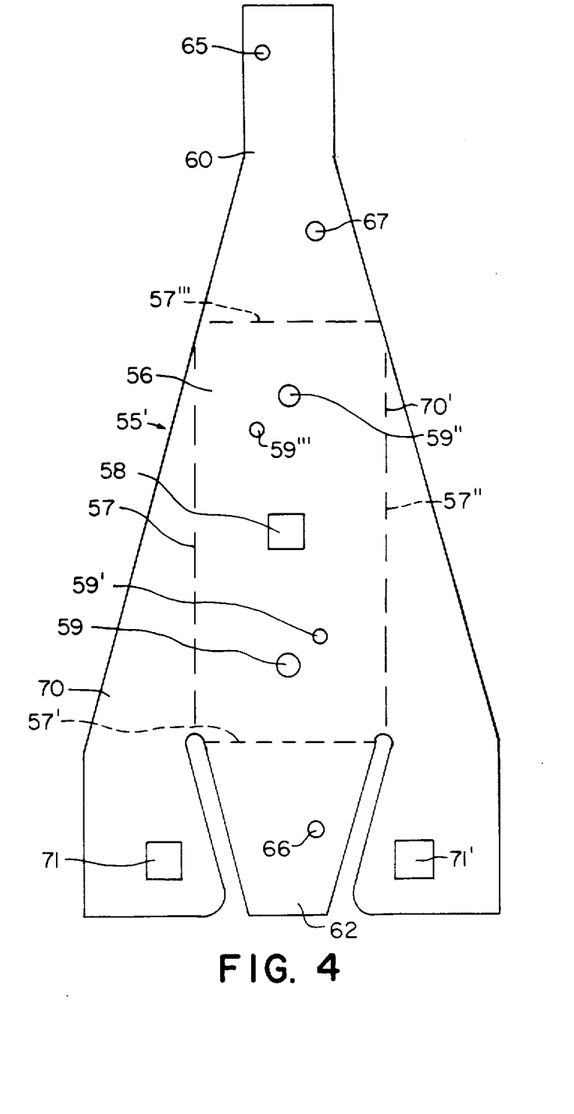
FIG. 4 is a plan view of a roof rafter wall connector blank of this invention.
Figure 5:
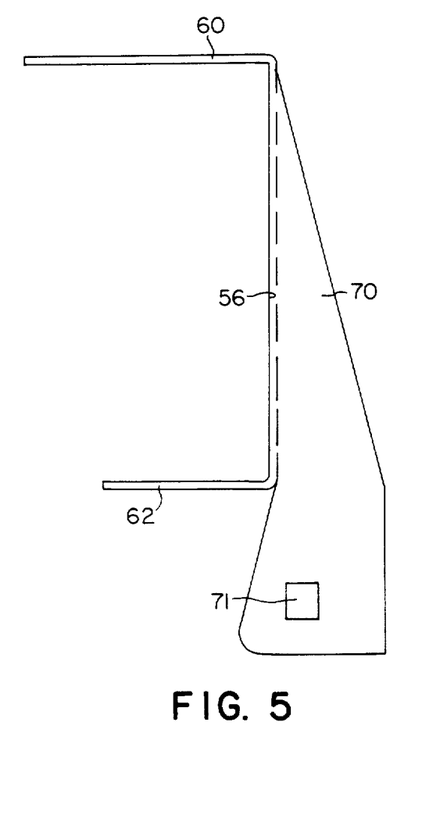
FIG. 5 is a side elevation of the connector of FIG. 4 formed into finished shape.
Figure 6:
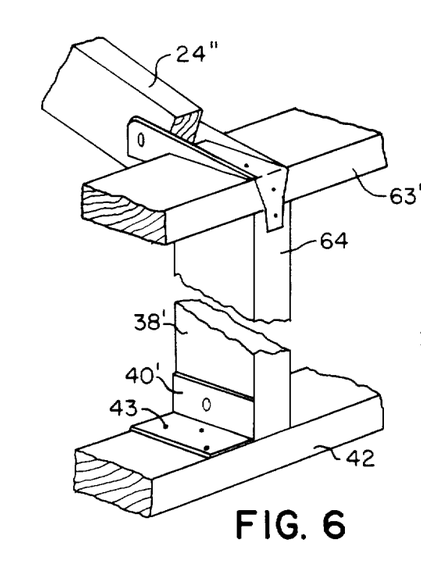
FIG. 6 is a perspective view of the connector of FIG. 4 applied to framing members.

Referring to FIGS. 4, 5, and 6, rafter to sidewall connector blank 55' shown in FIG. 4 preferably comprises stock similar to to that of blank 15 of FIG. 1 such as sheet metal and is shown with central portion 56 being defined by dashed lines 57, 57', 57", 57'. For convenience of illustration in FIG. 4, such lines denote locations on which end tabs 60, 62 and symmetrical side portions 70, 70' are bent perpendicularly to central portion 56 to form connector 55' of FIGS. 5 and 6. As so bent, side portions 70, 70' are disposed in facing parallel juxtaposition as are end tabs 60, 62 with the latter set bent oppositely from central portion 56 than the former, and with both such sets and the central portion being disposed mutually perpendicular. Tab 60 extends sufficiently to reach stuf 64 as shown in FIG. 6 enabling the connector to be nailed to stud 64 as well as to stud wall plate 63 through use of nailing holes 65 and 67, respectively. The integrity of a building structure against having the roof structure lifted from the building walls in violent wind conditions is virtually assured by tying the rafter to both the wall plate 63 and stud 64 by connector 55'. Conventional practice in the United States is to provide nominal two inch dimension lumber for plate 63 and accordingly tab 60 should sufficiently exceed the one-and-one-half thickness of such lumber to place hole 65 at least about one inch from the top end face of stud 64 with hole 67 being located three-quarter inch below central planar portion 56 of connector 55' for being nailed into the edge face thereof. Tab 62 is shown disposed parallel to tab 60 for being fastened to plate 63 by nailing through hole 66. Central portion 56 of connector 55' rests on the top of plate 63 as seen in FIG. 6 and can be fastened thereto through use of any of holes 58, 59, 59', 59'' or 59'''. Any other pattern of holes may be provided as desired.

Symmetrical side portions 70, 70' of connector 55' are bent along lines 57, 57'', respectively, into parallel facing juxtaposition placing them in mutually perpendicular disposition to central portion 56 and tabs 60,62 as shown in FIGS. 5 and 6. Portions 70, 70' are not required to be symmetrically configured, but are required to reach beyond the outward face of tab 62 sufficiently to enable rafter end 24'' to be operably fastened through use of carriage bolt holes 71, 71' in side portions 70, 70'. The side profile of portions 70,70' as seen in FIG. 5 should be sufficiently low to enable a least roof pitch which may be desired to be used without connector 55' projecting upward beyond a line extensin coming from the top plane of a rafter to the outer top edge of plate 63 so as to enable roof sheathing to extend beyond the sidewall of a building and provide an eave, such an arrangement making it possible to provide a straight tight joint between sidewall and roof sheathing without accomodating the presence of rafters extending in the eave overhang by notching of the sidewall sheating. The rafters used in conjunction with connectors 15' and 55' can be square end cut and be placed to provide any desired roof pitch requiring no more than drilling of a single hole in each end and bolting to the connectors, so as to completely eliminate angle cutting and notching in conventional manner, and angle nailing of rafters to a roof ridge member as is normally required.

Use of connectors 15' and 55' enable a person to erect a pitched roof unassistedly by pivotally bolting such connectors to opposite ends of the roof rafters for one roof plane and fastening connectors 55' to one stud wall while the rafters are supported by use of two lengths of lumber spanning the tops of the stud walls and on which the ridge piece is laid as support for the free ends of the rafters. The connectors 15' are then fastened to the ridge piece and the ridge piece is raised to the final desired position where it is propped while the rafters for the other roof plane are installed. Horizontal tying members are preferably attached to one or more sets of rafter pairs before the supporting lumber and props are removed. The use of pivotal bolting is essential to provide the "tip-up" capability for the first roof plane to be framed and erected, and is a requirement for enabling a person to construct a pitched roof without assistance.

Figure 7:
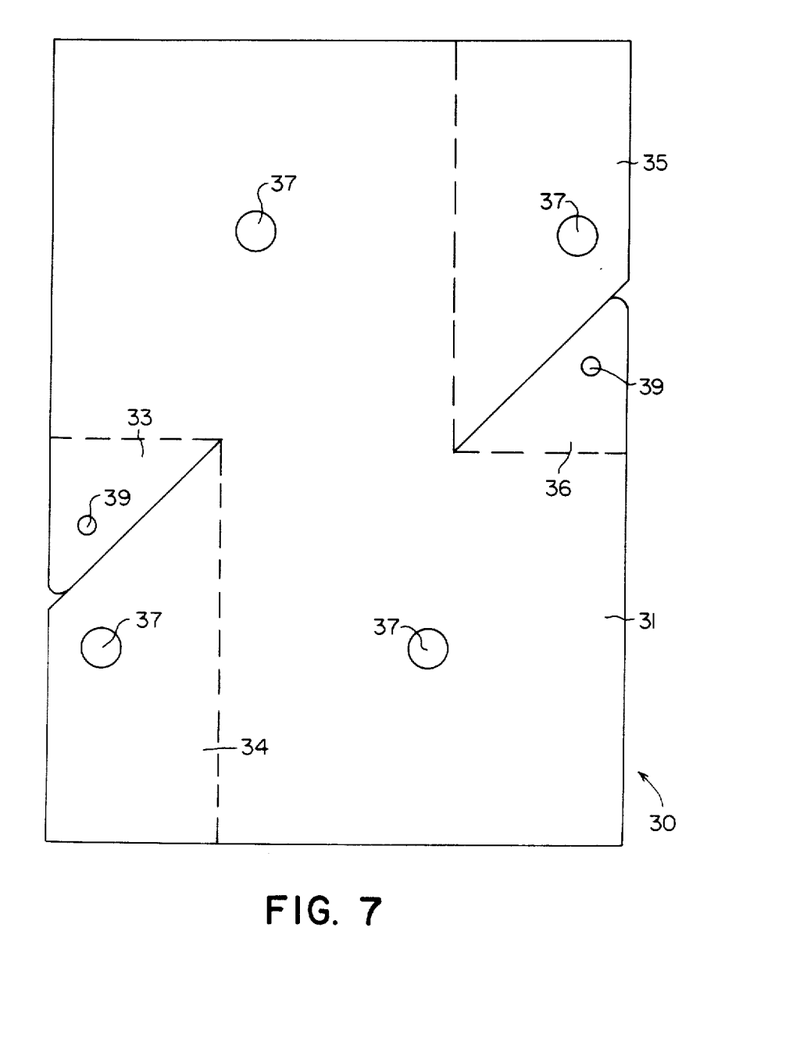
FIG. 7 is a plan view of a base corner connector blank of this invention.
Figure 8:
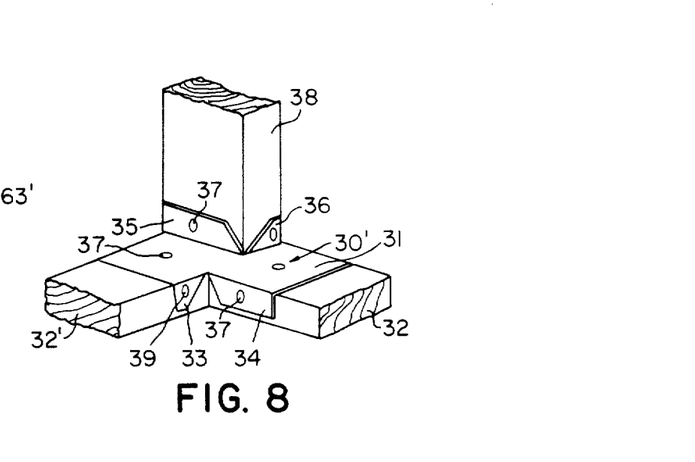
FIG. 8 is a perspective view of the connector of FIG. 7 formed into finished shape and applied to framing members.

In FIGS. 7 and 8 shown, respectively, stud wall plate corner squaring connector blank 30 and formed connector 30' as applied to sole plates 32, 32', and stud corner post 38. Connector 30' is universal for use with any base corner without regard to right-hand or left-hand orientation. Plate corner squaring connector 30' is configured as shown in FIG. 8 with a rectilinear central planar portion 31 embodying diagonally opposite notches comprising right angular interior corners formed by downward turned tabs 33, 34 for locating the interior corner of sole plates 32, 32' as shown in FIG. 8, and by upward turned tabs 35, 36 for locating and rendering plumb, corner stud 38 thereby providing for a self-truing suare and plumb lower wall corner construction in building framing. Holes 37 may be provided as appropriate for bolting the connector to the plate members and corner stud, or nailing. Nailing holes 39 may be provided for use to impart added rigidity in holding corner stud 38 in trued and plumbed position. The use of connector 30' eliminates the need to either toe-nail or to end-nail a framing member to securely locate, fasten and brace a stud wall corner and virtually assures that the member will be true in plumb and square alignment. The connectors are universal for use with any one size of framing lumber such as, for example, nominal two by four inch lumber as shown in the illustrations and regardless of positioning, whether at a right hand or a left hand bottom corner. The upwardly extending tabs 35, 36 as viewed in FIG. 8 are mutually perpendicular with each other and with central portion 31, and similarly, downward turned tabs 33, 34 are mutually perpendicular with each other and with central portion 31. Tabs 33, 36 are also substantially coincidantlyy co-planar as shown.

Figure 9:
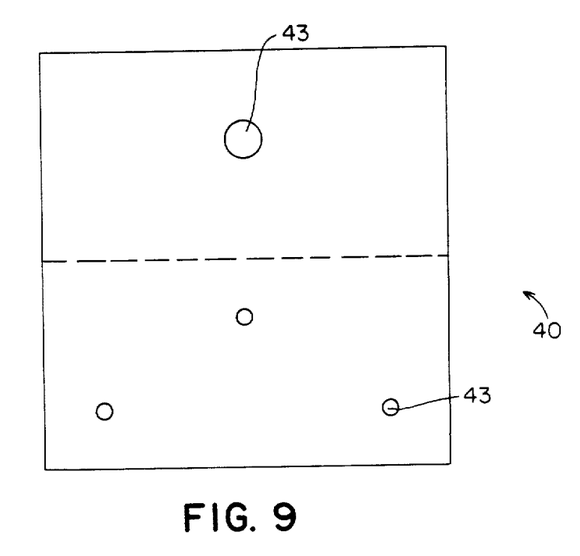
FIG. 9 is a plan view of a stud connector blank of this invention.
Figure 10:
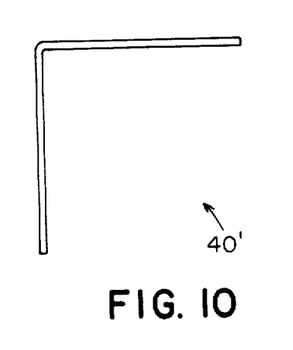
FIG. 10 is a perspective view of the connector of FIG. 9 formed into finished shape and applied to framing members.
Figure 11:
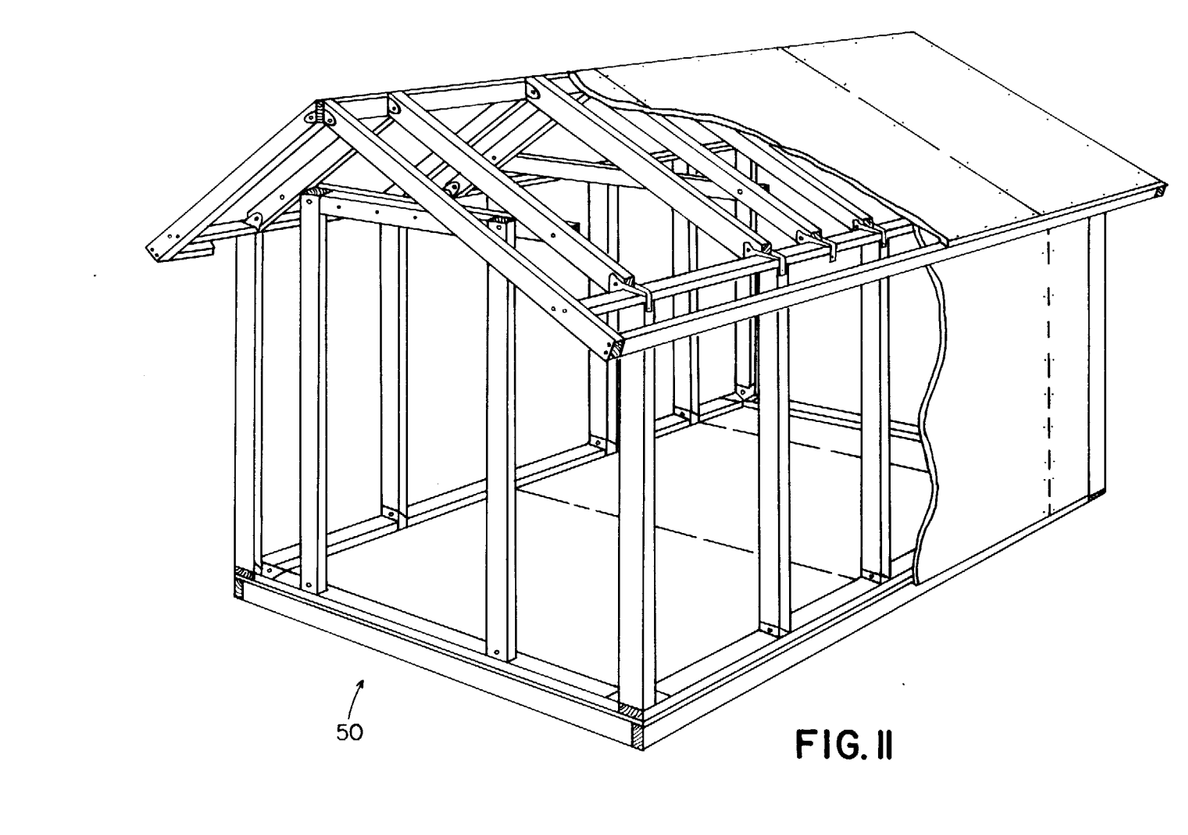
FIG. 11 is a perspective view of a building framed using the method and hardware of this invention with sheathing members shown in partial section.
Figure 12:
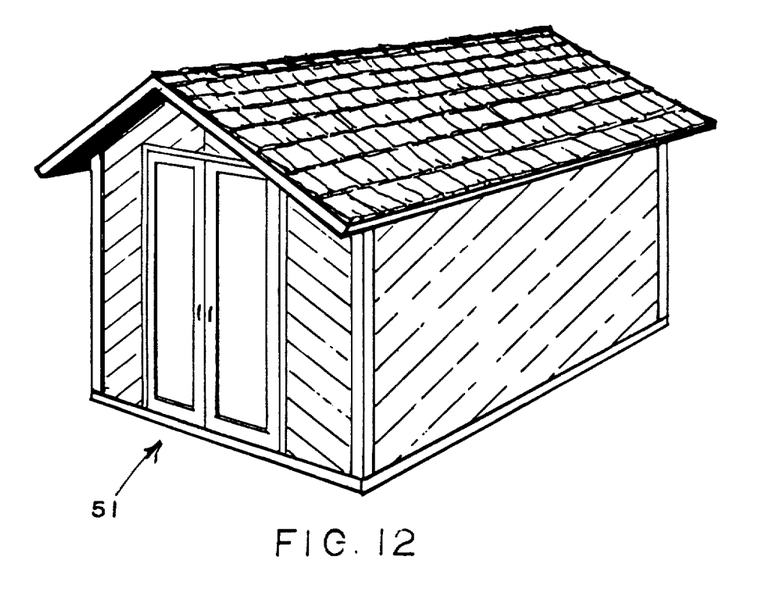
FIG. 12 is a perspective view of a building of FIG. 11 in completed form.

FIGS. 9 and 10 show stud-to-plate connector blank 40, and formed connector 40', respectively, the latter being shown applied to stud 38' and sole plate 42 in FIG. 6. As shown in FIG. 6, connector 40', is bent into right angular configuration from flat stock comprising blank 40 and is provided with nailing holes 43 for being secured to stud 38 and plat member 42. The use of connector 40' assures a square fit being obtained between stud 38 and plate member 42 and eliminates the need for toe nailing or end nailing such members. When used in combination with other fasteners described herein, the connector 40' serves to eliminate the need completely for such nailing in constructing a pitched roof building frame, such a structure being shown in FIG. 11 with sheathing being shown in partial cutaway illustration of unfinished garden house 50. In FIG. 12, finished structure 51 is shown with decorative roof shingles and lap siding added. In FIG. 6, stud to plate formed connector 40' is shown installed at the sole palte of a stud wall. Stud wall sole plate corner connector 30' shown installed in FIG. 8 would be used at the opposite end of either of the sole plate members 32, 32' by inverting the connector and rotating it 180 degrees, such manipulation causing it to be oriented properly for use at either location. For the remaining corner of a four cornered building, the connector would be oriented in identical manner to that shown in FIG. 8. Thus, connector 30' is usable in any base corner of a framed building.

I claim:

1. Apparatus for enabling square-end roof rafters to be used in framing and erecting a pitched roof on a building by an individual working unassisted in which said building includes a roof ridge member, at least one building sidewall having upper and lower stud wall plates and a plurality of square end rafters, said apparatus comprising:

(a) a plurality of symmetrically configured roof-ridge-to-rafter-end connectors each configured with a pair of channel shaped terminal portions consisting of a generally rectilinear channel back and a pair of spaced channel sides being perpendicular to and integrally connected with said channel back and parallel to one another for receiving rafter end extremities, said channel shaped terminal portions being integrally connected in separated channel-back to channel-back juxtaposition by a central planar portion disposed mutually perpendicular to said channel sides and channel backs of said channel shaped terminal portions and forming with said channel backs of said channel shaped terminal portions a channel configured pocket for receiving a lower portion of a roof ridge member extending transversely to said rafters wherein said central planar portion comprises the back of said channel configured pocket and said channel backs of said channel shaped terminal portions comprise the sides of said channel configured pocket, said channel sides of said channel shaped terminal portions being further configured to receive a bolt through each facing pair thereof, and wherein each of said channel backs comprises a substantially rectilinear planar portion having a pair of side edges integrally connected with said pair of channel sides, a bottom edge integrally connected with said central planar portion and a free edge opposite said bottom edge and said adjacent to each of said side edges which is free of connection with any further structure and (b) a plurality of rafter-end-to-stud-wall-plate connectors each configured with a substantially rectilinear central planar portion having four edges defining the end extremities of said central planar portion, said four edges including a first pair of edges disposed on opposite sides of said central planar portion and lying generally parallel to one another and a second pair of edges disposed on opposite sides of said central planar portion, lying generally parallel to one another between the end extremities of said first pair of edges and being generally perpendicular to said first pair of edges, a first pair and a second pair of spaced parallel facing planar portions extending from said first and second pair of edges, respectively, said first planar portion pair being disposed perpendicular to said central planar portion, said second planar portion pair being disposed mutually perpendicular to both said central planar portion and said first planar portion pair and projecting from said central portion in a direction opposite that of said first planar portion pair, said second planar portion pair configured to extend beyond an end extremity of said central planar portion defined by one of said first pair of edges for receiving the end of a rafter in the spacing between parallel planar portions thereof, said roof-ridge-to-rafter-end connectors and said rafter-end-to-stud-wall-plate connectors, when used in complementary fashion with one each attached to opposite end extremities of a rafter enabling an individual working alone to erect a pitched roof frame on a building using only squared-end rafters.

2. The apparatus of claim 1 comprising in addition, to enable a stud wall, pitched roof wood frame building having at least one corner stud to be constructed without requiring angle cutting or angle nailing of framing members, a plurality of plate corner squaring connectors configured with a substantially rectilinear central planar portion and diagonally opposed notched corners wherein said notched corners have a right angular interior configuration with tabs projecting perpendicularly to said central planar portion from edges defining said corners, said tabs in each said corner notch being disposed perpendicular to each other and to said central planar portion and extending from said central planar portion in the same direction, said tabs in each of said corner notches further extending from said central planar portion in a direction mutually opposite to said tabs of said other said corner notch, said plate corner squaring connectors being usable to connect a corner stud to a stud wall plate irrespective of right hand or left hand orientation.

3. A roof ridge connector for connecting an end of a roof rafter to a roof ridge comprising a pair of channel shaped terminal portions each adapted for receiving an end of a roof rafter, each of said pair of channel shaped terminal portions consisting essentially of a channel back and a single pair of spaced channel sides in which said spaced channel sides are perpendicular to and integrally connected with said channel back and parallel to one another, each of said channel shaped terminal portions further beign integrally connected in separated channel-back to channel-back juxtaposition by a central planar portion disposed mutually perpendicular to said channel sides and said channel backs of said channel shaped terminal portions and forming with said channel backs of said channel shaped portions a channel configured pocket for receiving a roof ridge extending transversely to said roof rafters wherein said central planar portion comprises the back of said channel configured pocket and said channel backs of said channel shaped terminal portions comprise the sides of said channel configured pocket, said channel sides of said channel shaped terminal portions having an opening therethrough to receive a bolt through each facing pair thereof and wherein each of said channel backs comprises a substantially rectilinear planar portion having a pair of side edges integrally connected with said pair of channel sides, a bottom edge integrally connected with said central planar portion and a free edge opposite said bottom edge and adjacent to each of said side edges which is free of connection with any further structure.

4. The connector of claim 3 wherein each of said channel sides includes a bottom edge being in substantially coplanar relationship with said central planar portion.

5. A connector for connecting an end of a roof rafter with an upper stud plate of a building sidewall comprising a substantially rectilinear central planar portion having individual edges defining the end extremities of said central planar portion, said individual edges including a first pair of edges disposed on opposite sides of said central planar portion and lying generally parallel to one another and a second pair of edges disposed on opposite sides of said central planar portion, lying generally parallel to one another between the end extremities of said first pair of edges and being generally perpendicular to said first pair of edges, a first pair and a second pair of spaced parallel facing planar portions extending from said first and second pair of edges, respectively, said first planar portion pair being disposed perpendicular to said central planar portion, said second planar portion pair being disposed mutually perpendicular to both said central planar portions and said first planar portion pair and projecting from said central portion in a direction opposite to said first planar portion pair, said second planar portion pair configured to extend beyond an end extremity of said central planar portion defined by one of said first pair of edges for receiving an end of a roof rafter in the spacing between parallel portions thereof.

6. The connector of claim 5 wherein a portion of said second planar portion pair which extends beyond an end extremity of said central planar portion extends to a side of the plane of said central planar portion opposite to the side of the plane of said central planar portion from which said second planar portion pair extends.

7. The connector of claim 6 wherein that portion of said second planar portion pair which extends beyond an end extremity of said central planar portion includes an opening therethrough to receive a bolt through each facing pair.

8. The connector of claim 7 wherein at least one of the planar portions of said first planar portion pair extending from said central planar portion a distance sufficient to extend below said upper stud plate when being used.

9. The connector of claim 8 wherein said one of the planar portions of said first planar portion pair extends from said central planar portion a distance greater than one and one-half inches.

10. The connector of claim 5 wherein said central planar portion includes an opening to receive a bolt for connection of said connector to the upper stud plate.

11. A connector enabling the connection of a corner stud to a stud plate of a building without the angle nailing of framing members comprising a central planar portion and diagonally opposed notched, interior corners wherein said notched corners have a right angular interior configuration with tabs projecting perpendicularly to said central planar portion from edges defining said corners, said tabs in each of said corner notches being disposed perpendicular to each other and to said central planar portion and extending from said central planar portion in the same direction, said tabs in each of said corner notches further extending from said central planar portion in a direction mutually opposite to the tabs of said other corner notch.

12. The connector of claim 11 wherein said central planar portion is substantially rectilinear.

13. The connector of claim 12 wherein at least one of said notched corners has dimensions equal to the cross-sectional dimensions of said corner stud.

14. The connector of claim 12 wherein at least one of said notched corners has dimensions approximately $1\frac{1}{2} \times 3\frac{1}{2}$ inches.

* * * * *

UNITED STATES PATENT AND TRADEMARK OFFICE
CERTIFICATE OF CORRECTION

PATENT NO. : 4,713,923
DATED : December 22, 1987
INVENTOR(S) : Ulrich Sielaff and David O. Hamel It is certified that error appears in the above-identified patent and that said Letters Patent is hereby corrected as shown below:

In column 1, line 31 delete "perofrm" and insert --perform--.

In column 2, line 25, delete "21', 22" and insert --21' 22'--.

In column 2, line 42, delete "57, 57', 57'', 57'"' and insert --57, 57', 57'', 57'''--.

In column 2, line 52, delete "stuf" and insert --stud--.

In column 3, line 17, delete "extensin" and insert --extension--.

In column 3, line 24, delete "sheating" and insert --sheathing--.

In column line 14, "coincidantlly" should be --coincidently--

In column 4, line 21, delete "plat" and insert --plate--.

In column 4, line 33, delete "palte" and insert --plate--.

UNITED STATES PATENT AND TRADEMARK OFFICE
CERTIFICATE OF CORRECTION

PATENT NO. : 4,713,923

DATED : December 22, 1987

INVENTOR(S) : Ulrich Sielaff and David O. Hamel

It is certified that error appears in the above-identified patent and that said Letters Patent is hereby corrected as shown below:

In column 6, line 10, delete "beign" and insert --being--.

Signed and Sealed this

Fifth Day of July, 1988

Attest:

DONALD J. QUIGG

Attesting Officer

Commissioner of Patents and Trademarks